United States Patent
Saimani et al.

(10) Patent No.: US 11,307,879 B2
(45) Date of Patent: Apr. 19, 2022

(54) PERSONALIZED HELP USING USER BEHAVIOR AND INFORMATION

(71) Applicant: INTUIT INC., Mountain View, CA (US)

(72) Inventors: Jayanth Saimani, Bangalore (IN); Prabhat Hegde, Bangalore (IN); Ajit Roy, Bangalore (IN); Satyajit Bhowmik, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/504,509

(22) Filed: Jul. 8, 2019

(65) Prior Publication Data

US 2020/0019420 A1    Jan. 16, 2020

(30) Foreign Application Priority Data

Jul. 11, 2018  (IN) .............................. 201821025864

(51) Int. Cl.
  *G06F 9/451* (2018.01)
  *G06Q 40/00* (2012.01)
  *G06N 5/04* (2006.01)

(52) U.S. Cl.
  CPC .............. *G06F 9/453* (2018.02); *G06N 5/04* (2013.01); *G06Q 40/123* (2013.12)

(58) Field of Classification Search
  CPC ..... G06F 3/04895; G06F 9/453; G06Q 40/12; G06Q 40/123
  See application file for complete search history.

(56) References Cited

U.S. PATENT DOCUMENTS

| | | | |
|---|---|---|---|
| 8,024,660 B1 * | 9/2011 | Quinn .................... | G06F 9/453 715/745 |
| 8,234,562 B1 * | 7/2012 | Evans .................. | G06F 40/174 715/224 |
| 8,346,635 B1 * | 1/2013 | Olim ...................... | G06Q 40/12 705/30 |
| 8,386,966 B1 * | 2/2013 | Attinasi .............. | G06F 11/3438 379/93.01 |
| 8,468,110 B1 * | 6/2013 | Podgorny ........... | G06F 11/3438 706/45 |
| 2006/0059434 A1 * | 3/2006 | Boss .................... | G06F 16/9535 715/780 |

(Continued)

*Primary Examiner* — Linda Huynh
(74) *Attorney, Agent, or Firm* — Patterson & Sheridan, LLP

(57) ABSTRACT

Certain aspects of the present disclosure provide techniques for improving a user experience of an application. Embodiments include receiving user activity information related to activities of a user during use of the application. Embodiments include providing the user activity information as input to a predictive model. The predictive model may have been trained using historical activity data and historical solution data associated with a plurality of users to determine actionable solutions to issues related to use of the application. Embodiments include determining, based on output from the predictive model, an actionable solution to an issue related to use of the application by the user. Embodiments include providing the actionable solution to the user via a user interface associated with the application. The actionable solution may be provided without being initiated by the user.

21 Claims, 5 Drawing Sheets

(56) References Cited

U.S. PATENT DOCUMENTS

| | | | |
|---|---|---|---|
| 2006/0178961 A1* | 8/2006 | Stanley | G06Q 40/123 705/31 |
| 2011/0246880 A1* | 10/2011 | Horton | G06F 9/453 715/708 |
| 2012/0084185 A1* | 4/2012 | Ciaramitaro | G06Q 40/123 705/31 |
| 2012/0290521 A1* | 11/2012 | Frank | G06N 20/00 706/45 |
| 2013/0097498 A1* | 4/2013 | Steinberg | G06F 3/0482 715/708 |
| 2013/0211880 A1* | 8/2013 | Kannan | G06Q 30/0203 705/7.32 |
| 2016/0247239 A1* | 8/2016 | Houseworth | G06Q 40/123 |
| 2017/0011213 A1* | 1/2017 | Cavanagh | G06F 21/31 |
| 2017/0206365 A1* | 7/2017 | Garcia | G06F 21/6245 |
| 2018/0173768 A1* | 6/2018 | Troisvallets | G06F 16/24564 |
| 2019/0163594 A1* | 5/2019 | Hayden | G06F 11/2257 |
| 2019/0179649 A1* | 6/2019 | Kadambala | G06Q 10/06393 |
| 2019/0318421 A1* | 10/2019 | Lyonnet | G06N 20/20 |
| 2019/0347148 A1* | 11/2019 | Gomes Pereira | G06F 11/079 |

* cited by examiner

PERSONALIZED HELP USING USER BEHAVIOR AND INFORMATION

RELATED APPLICATIONS

The present application claims priority under 35 U.S.C § 119 to India Provisional Application No. 201821025864, entitled "PERSONALIZED HELP USING USER BEHAVIOR AND INFORMATION," by the same inventors, filed in India on 11 Jul. 2018 (Client Ref. No.: 1810789IN; P+S Ref. No.: INTU/0328IN).

INTRODUCTION

Aspects of the present disclosure relate to providing personalized help to users. In particular, embodiments described herein involve improving a user experience by providing personalized help based on user behavior and information.

BACKGROUND

Applications often provide users with various forms of assistance in use of the application. Live support agents may be available to assist a user over the phone or through web-based communication, such as through a chat window. Self-help content may also be provided to users in order to allow the users to find solutions to issues that they may encounter during use of applications. For example, users may be able to search for relevant self-help content within an application or an online source associated with the application.

While self-help content can be useful, it is often difficult for users to locate content that is relevant to the particular issues they are facing. Users may often contact a live support agent after or instead of accessing self-help resources if it is difficult or inconvenient to locate relevant content within the self-help resources. However, providing live support to users is expensive and time-consuming. Furthermore, a user experience may be disrupted by difficulties in resolving issues through impersonal self-help content or by the inconvenience of contacting live support agents. In some cases, the negative impact of these issues on a user's experience could lead to the user temporarily or permanently abandoning use of the application. As such, there is a need for improved techniques for providing assistance to users of applications.

BRIEF SUMMARY

Certain embodiments provide a method for improving a user experience of an application. The method generally includes receiving user activity information related to activities of a user during use of the application; providing the user activity information as input to a predictive model, wherein the predictive model has been trained using historical activity data and historical solution data associated with a plurality of users to determine actionable solutions to issues related to use of the application; determining, based on output from the predictive model, an actionable solution to an issue related to use of the application by the user; and providing the actionable solution to the user via a user interface associated with the application, wherein the actionable solution is provided without being initiated by the user.

Other embodiments provide a non-transitory computer-readable medium comprising instructions that, when executed by one or more processors, cause the one or more processors to perform a method for improving a user experience of an application. The method generally includes receiving user activity information related to activities of a user during use of the application; providing the user activity information as input to a predictive model, wherein the predictive model has been trained using historical activity data and historical solution data associated with a plurality of users to determine actionable solutions to issues related to use of the application; determining, based on output from the predictive model, an actionable solution to an issue related to use of the application by the user; and providing the actionable solution to the user via a user interface associated with the application, wherein the actionable solution is provided without being initiated by the user.

Other embodiments provide a system comprising one or more processors and a non-transitory computer-readable medium comprising instructions that, when executed by the one or more processors, cause the one or more processors to perform a method for improving a user experience of an application. The method generally includes receiving user activity information related to activities of a user during use of the application; providing the user activity information as input to a predictive model, wherein the predictive model has been trained using historical activity data and historical solution data associated with a plurality of users to determine actionable solutions to issues related to use of the application; determining, based on output from the predictive model, an actionable solution to an issue related to use of the application by the user; and providing the actionable solution to the user via a user interface associated with the application, wherein the actionable solution is provided without being initiated by the user.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
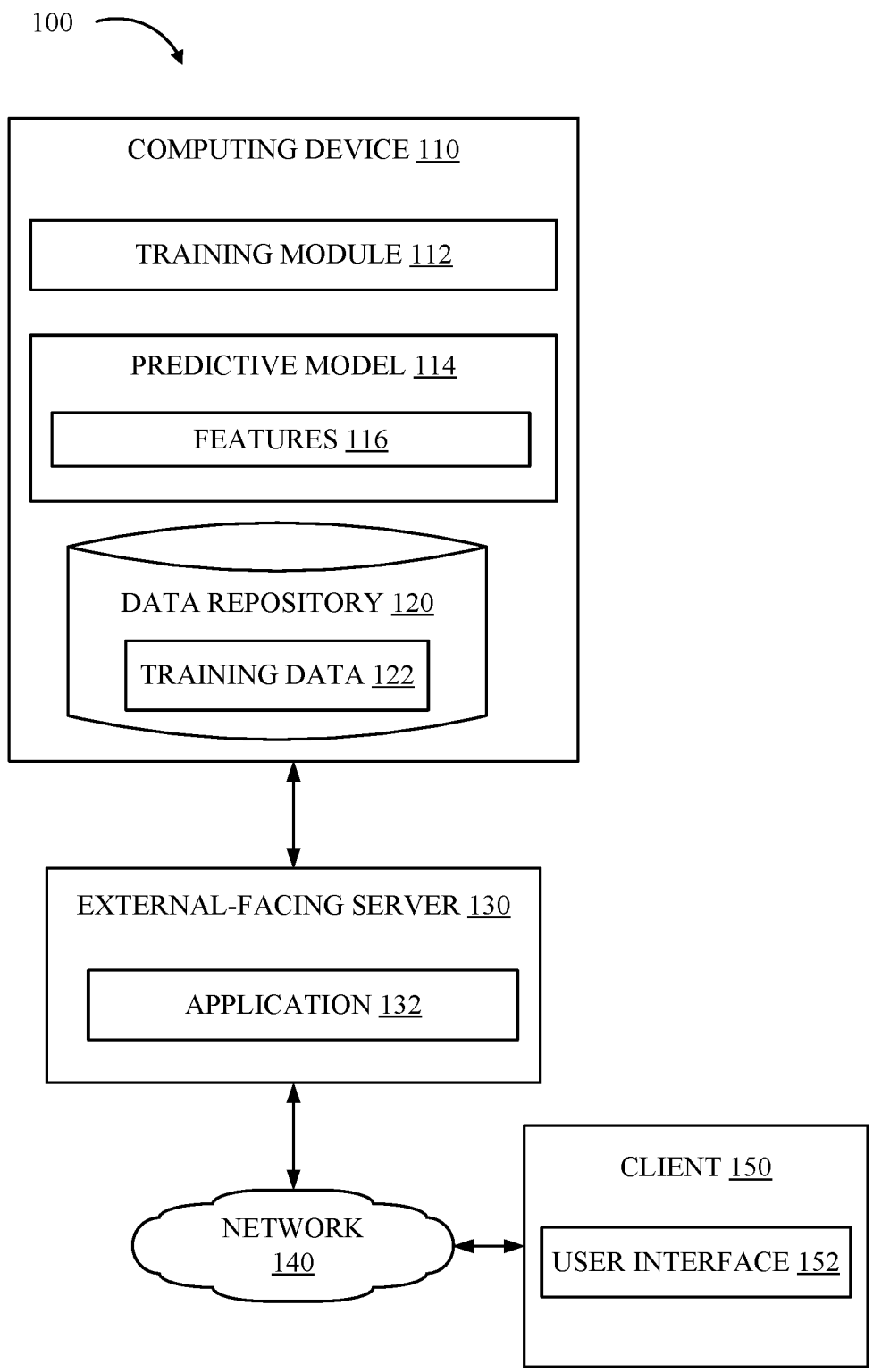
FIG. 1 depicts an example computing environment in which systems of the present disclosure may operate.

Aspects of the present disclosure provide apparatuses, methods, processing systems, and computer readable mediums for improving a user experience of an application. In particular, embodiments of the present disclosure involve using activity data related to use of an application by users to automatically identify issues and proactively deliver actionable solutions to users during use of the application A user of an application may encounter issues during use of the application that detract from the user's experience. For example, issues may be related to improper or inefficient use of the application by the user, software or hardware problems (e.g., connectivity issues), and/or issues separate from the application (e.g., issues with separate applications that interact with the application). As used herein, "inefficient" use of an application generally refers to a manner of using an application that results in a time to complete one or more tasks exceeding a threshold or, in some instances, a manner of using the application that is identified by particular individuals, such as users or support agents, as being inefficient. In some cases, the user may seek assistance, such as by searching for self-help content (e.g., within the application or in an outside source, such as an online forum) or by contacting a live support agent. However, the user may have trouble locating a solution to an issue for a variety of reasons, such as an inability to accurately identify issues.

Techniques described herein make use of machine learning models in order to train a predictive model using historical data to identify issues and determine actionable solutions based, at least in part, on user activity information related to using the application. In one example, historical data comprises a variety of types of data, such as clickstream data, search history, chat data, online forums, voice data from user conversations with live support agents, product databases, error logs, and other data related to using the application. Issues and actionable solutions may be identified in the historical data. For example, a particular clickstream may be commonly associated with particular indicators of an issue. Certain clickstream data may be correlated, for instance, with a certain exception appearing in an error log or a self-help session being initiated by a user wherein certain search queries are used. Furthermore, a particular issue may be associated with a particular actionable solution in the historical data. For example, certain types of historical data (e.g., chat data, forum posts, clickstream data, and/or voice data from live support sessions) may include an actionable solution that historically resolved a particular issue. In other cases, comparing intermediate points of task completion (e.g., how quickly users complete various stages of a task, such as completing fields of a form) in clickstream data of various users in the historical data may reveal, for example, which clickstreams are more or less efficient and/or correct for completing a particular task. As such, the historical data is used to train the predictive model to recognize "signals" of an issue and to determine which signals are associated with an actionable solution. For example, a certain series of clicks in clickstream data may be associated with a correct manner of using the application in the predictive model as an actionable solution to the incorrect use of the application. Training of the predictive model may, for example, be performed according to supervised training methods (e.g., involving input features, corresponding to activity data, that are mapped to output labels that correspond to actionable solutions). Once trained, the predictive model is able to determine actionable solutions for issues that can be proactively provided to users by analyzing received input, such as activity data of a user.

Activity data generally refers to records of a user's activity within an application, such as clickstream data, search history, and other data related to use of the application. Historical data generally includes historical activity data as well as additional data related to actionable solutions, such as forum posts and help content. In some cases, personal user data (e.g., profile data) may also be used in training the predictive model and determining actionable solutions by the model. Certain issues and, accordingly, certain actionable solutions may be associated with particular personal user data. For example, newer users may be more likely to use an application inefficiently or incorrectly as compared to more experienced users and so actionable solutions that include efficient techniques for using the application may be associated with newer users. As another example, users that work in occupations that are related to the subject matter of the application may be less likely to encounter issues related to understanding the subject matter of the application. As another example, users identified as "super users" (e.g., based on length of use of the application, number of comments on a forum, efficient use of the application, and/or other indicators) may be determined to be more likely to use the application correctly and efficiently. As such, activity data from super users may be useful in identifying actionable solutions to issues related to inefficient use of the application, as the activities of super users may represent a more efficient use of the application.

Actionable solutions may include help content, tutorials, workflows, and/or other solutions related to use of the application that can be provided to a user, and may be provided proactively to a user without initiation by the user. For example, it may be determined, using the predictive model that the user is experiencing an issue that has historically been resolved by a solution described in a certain item of help content. The predictive model may output an identifier for the actionable solution, and the identifier may be used to retrieve the actionable solution for providing to the user. For example, the actionable solution may be stored, such as in a text file or a list of instructions, in association with the identifier. In certain embodiments, actionable solutions are stored as instructions in eXtensible Markup Language (XML) files that are interpreted by applications in order to provide the actionable solutions to users. As such, the item of help content is retrieved using the identifier output by the predictive model, and is proactively presented to the user via the application's user interface, such as in a pop-up window. In another example, rather than presenting help content to a user, a workflow of the application may be automatically changed to a different workflow that has historically resolved an issue experienced by the user. For instance, a user interface screen currently being viewed by the user may be automatically replaced with a different user interface screen, prompting the user to perform one or more tasks that are associated with the solution.

In one example, a financial application may allow users to link bank accounts to the application. A user may provide login information for the user's bank account to the application, and the application may automatically login to the user's bank account for the purposes of providing financial applications to the user (e.g., record keeping, financial planning, tax preparation, and/or the like). However, if the user's bank account login information becomes deactivated or changes (e.g., due to periodic mandatory password changes), the application may not be able to login to the user's bank account with the login information originally provided by the user. Historical data may show that a particular exception appears in an error log when this issue occurs, and that the issue is resolved by the actionable solution of updating, by the user, the user's login information for the bank account in the application or, in another example, updating, by the user, the user's login information with the bank account and then providing the updated login information to the application. As such, the historical data is used to train the predictive model to output, in response to receiving activity information that shares similar features with the historical data from a user, the actionable solution of prompting the user to update the user's login information for the bank account.

A user's activity information may be provided to the predictive model, which may determine that this activity information is associated with the actionable solution of updating the user's login information for the bank account in the application. As such, the user's workflow (e.g., viewing a home screen of the application) is proactively changed to the workflow of updating the user's login information for the bank account in the application. For example, the user may be prompted via the user interface to enter updated login information for the bank account, thereby resolving the issue.

Techniques described herein constitute an improvement with respect to conventional practices, such as requiring users of applications to identify issues themselves and/or actively request assistance when experiencing issues, as techniques described herein allow for the convenient and efficient resolution of issues by automatically detecting issues and proactively providing solutions to issues. Training a predictive model with historical data to identify and determine actionable solutions to issues related to use of an application directly improves a user experience of the application by allowing for problems to be resolved without requiring users to seek assistance and/or spend time determining the cause of a problem. Furthermore, proactively providing users with actionable solutions to issues may prevent issues before they occur and/or before they are detected by users, thereby increasing the users' satisfaction with the application. By avoiding and/or resolving problems efficiently, embodiments of the present disclosure improve the functioning, reliability, and usability of systems. Improvements described herein further promote user retention and save costs (e.g., costs associated with providing live support to users).

Machine Learning Concepts

Machine-learning models allow computing systems to improve and refine functionality without explicitly being programmed. For example, in the case of supervised techniques, given a set of training data, a machine-learning model can generate and refine a function that determines a target attribute value based on one or more input features. For example, if a set of input features describes an automobile and the target value is the automobile's gas mileage, a machine-learning model can be trained to predict gas mileage based on the input features, such as the automobile's weight, tire size, number of cylinders, coefficient of drag, and engine displacement.

The predictive accuracy a machine-learning model achieves ultimately depends on many factors. Ideally, training data for the machine-learning model should be representative of the population for which predictions are desired (e.g., unbiased and correctly labeled). In addition, training data should include a large number of training instances relative to the number of features on which predictions are based and relative to the range of possible values for each feature.

Machine-learning models that may be used to implement embodiments of the present disclosure are described in more detail below with respect to aspects of FIG. 1.

Example Computing Environment

FIG. 1 illustrates an example computing environment 100 in which systems of the present disclosure may operate. As shown, the computing environment 100 includes a computing device 110 and a data repository 120. The computing environment 100 may also include an external-facing server 130. While computing device 110 and external-facing server 130 are illustrated as individual units, computing device 110 and external-facing server 130 may represent processors, memory, and other hardware in a single machine or distributed across multiple machines and locations (e.g., in a cloud computing arrangement) in other examples. Similarly, data repository 120 may represent memory, storage, and cache resources distributed across multiple machines and locations. Computing environment 100 also includes a client 150, which is connected to external-facing server 130 and computing device 110 via network 140. In one embodiment, network 140 may be the Internet.

Application 132 may be a web application or some other software application that employs predictive functionality of predictive model 114 (e.g., to enhance the quality of experience (QoE) for consumers of the application 132, provide predictions or inferences, etc.). Predictive model 114 may, for example, comprise a machine learning model. For example, application 132 may be a financial applications application, and may use predictive model 114 to determine, based on activity data, actionable solutions to issues related to use of application 132 that can be proactively provided to the users. Application 132 may collect and send training data 122 to data repository 120, or training data 122 may be received from another source (e.g., training data 122 may be received from one or more databases associated with application 132). Training data 122 includes a collection of training instances. A training instance may comprise a set (e.g., a vector) of input features and a target value, a predictive model 114 may be trained using supervised learning techniques. In some embodiments, such as those in which predictive model 114 is a random forest classifier or other classification-type model, the target value is a label that predictive model 114 is trained to predict based on the input features, such as used in supervised learning techniques. Typically, the target value has been empirically verified for the training instance. For example, predictive model 114 may be configured to determine actionable solutions to issues identified in activity data based on historical data indicating solutions that were successfully used to resolve the issues under similar circumstances, such as in the context of similar activity data. Whether or not a solution was historically successful may be empirically verified, for example, using indicators of success in the historical data, such as confirmations from users (e.g., in text or voice data) that the solution was successful, clickstreams showing a task being successfully completed, clean error logs, and/or other indicators of success.

Historical data may be gathered over time from a plurality of users of application 132. For example, clickstream data, search history, chat and voice data from interactions with support professionals, forum data, logs, and the like may be collected as the plurality of users interact with application 132. An actionable solution to an issue identified in the historical data would be the label of a training instance, while the input features of the training instance would be derived from the historical data that is associated with the actionable solution, such as exceptions in an error log or particular clickstream data that led to the issue. In other words, a training instance may include a historical actionable solution (target feature) associated with a set of input features derived from historical data that corresponds to the historical actionable solution. In some embodiments, actionable solutions are associated with solution identifiers, and training instances include a solution identifier of an actionable solution as a label or target feature associated with a set of input features.

Actionable solutions identified in the historical data may be stored (e.g., in data repository 120), such as in the form of a series of instructions related to a workflow, a file containing help content, or a link to a forum post or other content, so that they may be accessed and provided to users. In certain embodiments, each actionable solution is stored in association with a solution identifier that uniquely identifies the actionable solution. In some embodiments, predictive model 114 outputs a solution identifier, and the solution identifier is used to retrieve an actionable solution and provide it to the user.

There are many different types of supervised machine-learning models that can be used for predictive model 114. For example, predictive model 114 may be a neural network, a support vector machine, a Bayesian belief network, a nearest-neighbor model (e.g., k-NN), a regression model, or a deep belief network, among others. Predictive model 114 may also be an ensemble of several different individual machine-learning models. Such an ensemble may be homogenous (i.e., using multiple member models of the same type, such as a random forest of decision trees) or non-homogenous (i.e., using multiple member models of different types). Individual machine-learning models within such an ensemble may all be trained using the same subset of training data 122 or may be trained using overlapping or non-overlapping subsets randomly selected from training data 122. It is noted that embodiments of the present disclosure are not limited to supervised machine-learning models, and may also include, for example, semi-supervised models.

Predictive model 114 includes features 116 that are used to determine the output of predictive model 114 for each training instance. Training data 122 is used by training module 112 to train predictive model 114. For example, predictive model 114 may be a random forest model, and training module 112 may build a "forest of trees" representing training data 122, where input features are randomly permuted at each split (e.g., each division of training data 122). In such embodiments, predictive model 114 is "trained" by constructing a plurality of decision trees based on sub-divisions of training data 122 that include random permutations of input features associated with labels.

Once trained, predictive model 114 is used by application 132 to determine actionable solutions that can be proactively provided to users based on activity information of the users. For example, application 132 may receive activity information related to use of application 132 by a user that interacts with application 132 via user interface 152. Application 132 provides one or more input features derived from the activity information (e.g., instances of clickstream data, search history, and the like) to predictive model 114, which may return a label (e.g., if predictive model 114 is a random forest classifier, it may return a label that identifies an actionable solution for an issue identified based on the input features). For example, predictive model 114 may return a particular item of help content that can be proactively provided to the user to address an issue related to use of application 132 by the user. In certain embodiments, personal user data of the user, such as profile information, may also be provided to predictive model 114 as one or more input features, and may also be used by predictive model 114 in determining an actionable solution.

Application 132 may provide the actionable solution determined using predictive model 114 to the user via user interface 152. For example, application 132 may retrieve the actionable solution based on a solution identifier output by predictive model 114 and proactively deliver the actionable solution (e.g., help content) to the user via a portion of user interface 152, such as text in a "help" window of user interface 152. In another example, application 132 may change a workflow currently being displayed in user interface 152 to a workflow associated with an actionable solution, such as a workflow to update login credentials associated with one or more of the user's accounts. In another example, application 132 may provide the user with instructions related to a more efficient or correct method of using application 132 via user interface 152 (e.g., an issue related to inefficient or incorrect use of the application by the user may be identified by comparing intermediate points in task completion among the historical data and the activity data of the user, and the actionable solution may related to a more efficient or correct way to use the application based on the historical data). In another example, application 132 may automatically take action to correct an issue, such as changing one or more settings to solve the issue and thereby improve the user experience or, alternatively, application 132 may direct the user to a settings page and/or provide the user with a settings recommendation so that the user may change the one or more settings.

Application 132 may alternatively provide information related to the actionable solution to another entity (e.g., a separate application), and the other entity may take action based on the actionable solution in order to resolve the issue and thereby improve the user experience. For example, application 132 may provide instructions to a separate application related to a user's bank account to initiate a process for changing the user's credentials.

Figure 2:
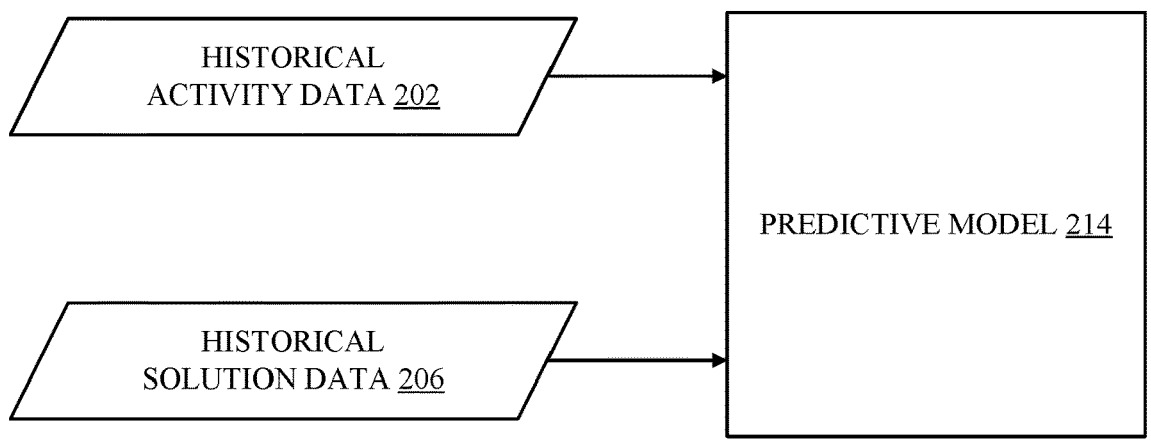
FIG. 2 depicts an example of training a predictive model for improving a user experience of an application as described herein.

FIG. 2 depicts an example 200 of training a predictive model for improving a user experience of an application as described herein. For instance, example 200 may be performed by training module 112 to train predictive model 114, as depicted and described with respect to FIG. 1. For example, predictive model 214 may be representative of predictive model 114 of FIG. 1.

Historical activity data 202 and historical solution data 206 are provided as input for training predictive model 214. Historical activity data 202 and historical solution data 206 may collectively be referred to as historical data. For example, historical activity data 202 and historical solution data 206 may be included in training data 122 of FIG. 1. In certain embodiments, historical activity data 202 is "featurized" for the purpose of training predictive model 214. For example, a feature may comprise an aspect of historical activity data 202, such as particular clickstream data, particular search terms, and/or particular log entries that are associated with particular solutions in historical solution data 206.

Historical activity data 202 may comprise data related to activities performed by one or more users with respect to an application, such as application 132 of FIG. 1. For example, historical activity data 202 may comprise clickstream data, search history, logs, and other data related to using the application by a plurality of users. Historical solution data 206 may comprise data related to actionable solutions to issues that are indicated by activity data 202. Historical solution data 206 is derived from a variety of sources, such as help content, forum posts, voice and chat data from live support sessions, email data between users and support agents, clickstream data that historically resulted in resolution of issues, logs, information provided by live support agents, and other data related to solutions. For example, historical solution data 206 may include data related to activities, content, and/or tutorials that historically resulted in the resolution of issues that are indicated by historical activity data 202. Predictive model 214 is trained using historical solution data 206 and historical activity data 202 to identify aspects of a user's activity data that are associated with actionable solutions that can be provided to the user for an issue that is indicated by the user's activity data. Training may, for example, involve constructing a random forest of trees based on input features derived from historical activity data 202 and labels derived from historical solution data 206 that is associated with particular aspects of historical activity data 202 (e.g., an item of help content that is frequently accessed in association with particular clickstream data), as described herein. Random forest models are only included as one example, and other types of models (Bayesian belief networks, nearest-neighbor models, regression models, deep belief networks, and the like) may be used.

While example 200 only shows historical activity data 202 and historical solution data 206 being used to train predictive model 214, it is noted that additional data may also be used to train predictive model, such as personal user data of users associated with the historical data.

Figure 3:
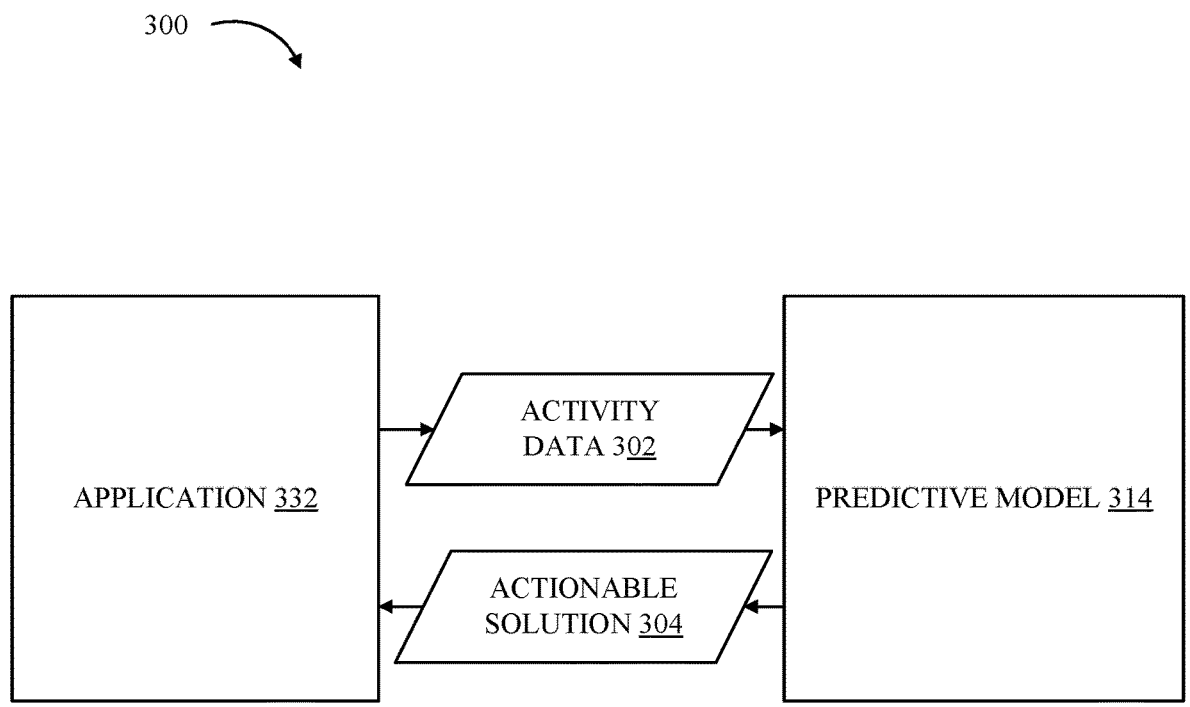
FIG. 3 depicts an example of using a predictive model as described herein to improve a user experience with an application by providing an actionable solution to an issue related to use of the application by the user.

FIG. 3 depicts an example 300 of using a predictive model as described herein to improve a user experience of an application by providing an actionable solution to an issue related to use of the application by a user. For example, application 332 and predictive model 314 may be representative of application 132 and predictive model 114 of FIG. 1. Predictive model 314 may have been trained as shown and described with respect FIG. 2.

In example 300, application 332 provides activity data 302 of a user to predictive model 314. Predictive model 314, having been trained based on historical activity data and historical solution data as shown and described with respect to FIG. 2, determines an actionable solution 304 to an issue that is indicated by aspects of activity data 302, and then provides the actionable solution 304 to application 332 so that it may be proactively provided to the user.

In one example, activity data 302 includes a particular exception identified in an error log and clickstream data indicating that the user had just launched the application before the exception was logged. Predictive model 314 determines, based on the exception and the clickstream data (which may each comprise an input feature provided to predictive model 314) that an actionable solution 304 is available to address an issue related to logging into the user's bank account by the application. For example, actionable solution 304 may comprise a workflow for updating the user's login information for the user's bank account in the application. As such, predictive model 314 provides the actionable solution 304 to application 332 so that application 332 may provide the actionable solution to the user via the user interface.

In certain embodiments, predictive model 314 assigns probability scores to different actionable solutions based on degrees of association between the input features (e.g., derived from activity data 302) and actionable solutions in predictive model 314 (which has been trained based on the historical data), and chooses an actionable solution that has the highest probability score, outputting the chosen actionable solution. In some embodiments, an actionable solution is only chosen if it has a probability score above a threshold. If predictive model 314 is a random forest classifier, a voting system is used to determine actionable solution 304 such that each time an input feature of activity data 302 matches an input feature associated with an actionable solution in the training data (e.g., as represented by a forest of decision trees), a vote is collected for the actionable solution.

Once received from predictive model 314, actionable solution 304 is provided by application 332 to the user via a user interface through which the user interacts with the application. In one example, application 332 automatically initiates a workflow for updating the user's login information for the user's bank account in the application by launching one or more user interface components for performing the workflow.

It is noted that, while example 300 only depicts activity data 302 being provided as input to the trained predictive model 314, additional data may also be provided along with activity data 302. For example, personal user data of the user may also be provided to the trained predictive model 314, and may further be used in determining actionable solution 304 (e.g., assuming predictive model 314 has been trained using personal user data as well).

Figure 4:
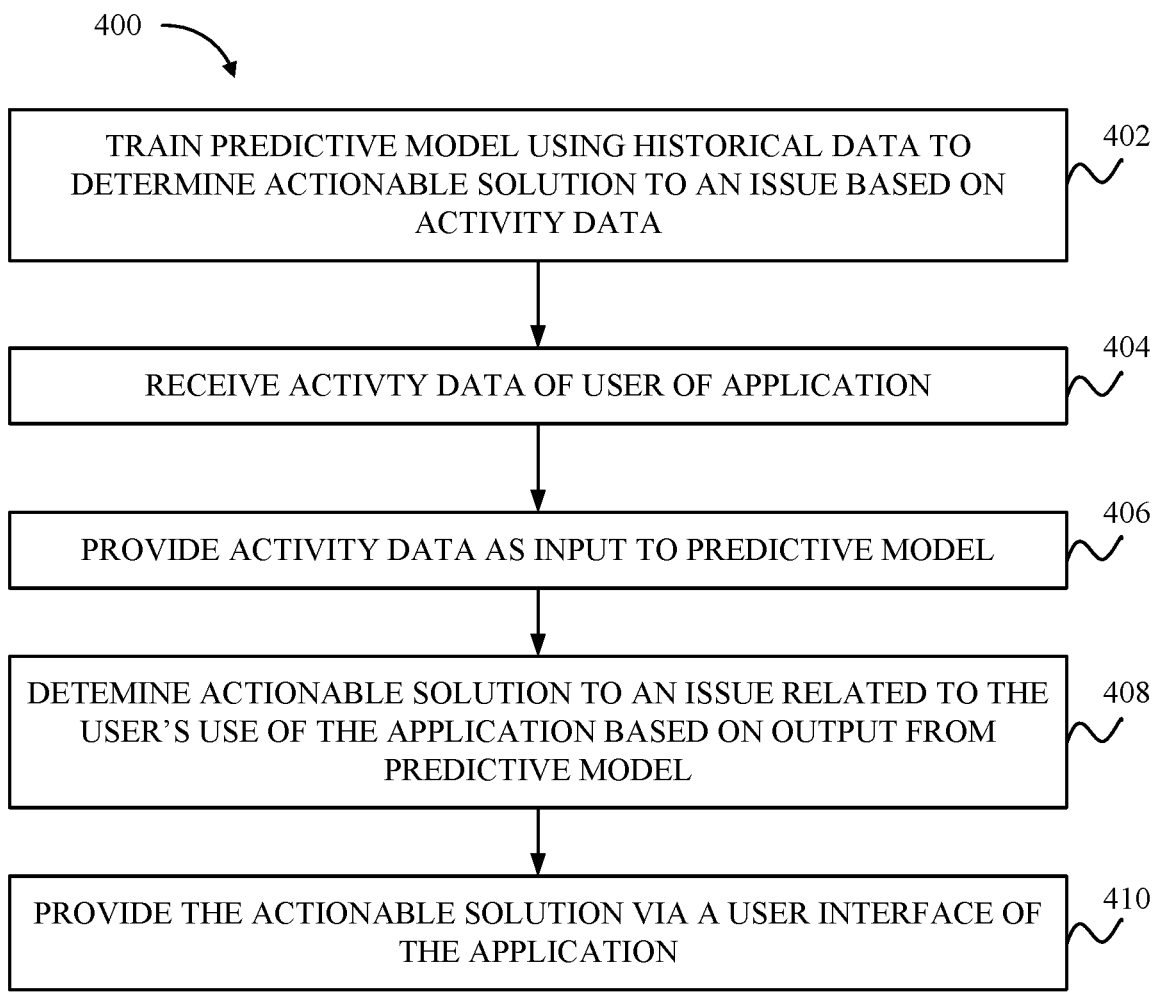
FIG. 4 depicts example operations for improving a user experience of an application.

FIG. 4 depicts example operations 400 for improving a user experience of an application. For example, operations 400 may be performed by one or more components of computing device 110 and external-facing server 130 as depicted and described with respect to FIG. 1.

At step 402, a predictive model is trained using historical data to determine an actionable solution to an issue based on activity data. For example, historical activity data and historical solution data may be derived from a variety of sources related to a plurality of users of an application, and may be featurized as described herein for the purpose of training the predictive model. Training may involve associating input features with labels that identify actionable solutions.

In certain embodiments, featurization includes comparing intermediate points in task completion in the historical activity data to determine which aspects of the historical activity data indicate an efficient or inefficient use of the application. For example, if historical activity data associated with a first user includes intermediate points in task completion indicating that the task took a certain amount of time to complete and historical activity data associated with a second user includes intermediate points in task completion indicating that the task took a shorter amount of time, than the historical activity data associated with the first user may be determined to exemplify an inefficient use of the application. The historical activity data associated with the first user may accordingly be associated in the predictive model with an actionable solution that is based on the activity data associated with the second user as part of the training process.

At step 404, activity data of a user of the application is received. For example, a user may interact with the application via a user interface, and data related to the user's interactions may be received, such as in the form of clickstream data, search history, logs, and other data related to the user's interactions.

At step 406, the activity data is provided as input to the predictive model. For example, one or more features may be derived from the activity data and provided as inputs to the predictive model. In certain embodiments, additional data such as personal user data of the user may also be provided as input to the predictive model (e.g., when the predictive model has been trained on such data).

At step 408, an actionable solution to an issue related to use of the application by the user is determined based on output from the predictive model. For example, the predictive model may determine the actionable solution from the activity data, and may return a solution identifier of the actionable solution as an output, and the actionable solution may be retrieved (e.g., from a file) based on the solution identifier.

At step 410, the actionable solution is provided to the user via the user interface of the application. For example, the actionable solution may be provided to the user in the form of help content, or a workflow may be initiated via the user interface to resolve the issue. In certain embodiments, the actionable solution is provided proactively to the user such that the user does not request or initiate the actionable solution. In other words, embodiments of the present disclosure involve preemptively providing an actionable solution to a user without requiring the user to actively seek a solution to the issue or even to recognize the issue before the actionable solution is provided. In some embodiments, the actionable solution is retrieved based on a solution identifier output by the predictive model, and comprises a series of instructions, such as in a structured data file such as an XML file or JSON file. The application may interpret the instructions in order to provide the actionable solution to the user without being initiated by the user.

In certain embodiments, results of the actionable solution may be used to further train the predictive model. For example, it may be determined that the actionable solution successfully resolved the problem based on sources such as logs (e.g., showing no errors and/or showing successful completion of a task), clickstream data (e.g., showing the user performing interactions with the application that indicate resolution of the issue), chat and/or voice data (e.g., indicating that the issue is resolved), forum posts by the user (e.g., describing how the problem was resolved to other users), and other data related to using the application. If it is determined that the actionable solution was successful, this information may be used to further train the predictive model, thereby increasing the likelihood of the actionable solution being chosen again based on similar activity data. Otherwise, if the actionable solution is determined from similar sources not to have been successful, this information may also be used to further train the predictive model, thereby decreasing the likelihood of the actionable solution being chosen again based on similar activity data.

Figure 5A:
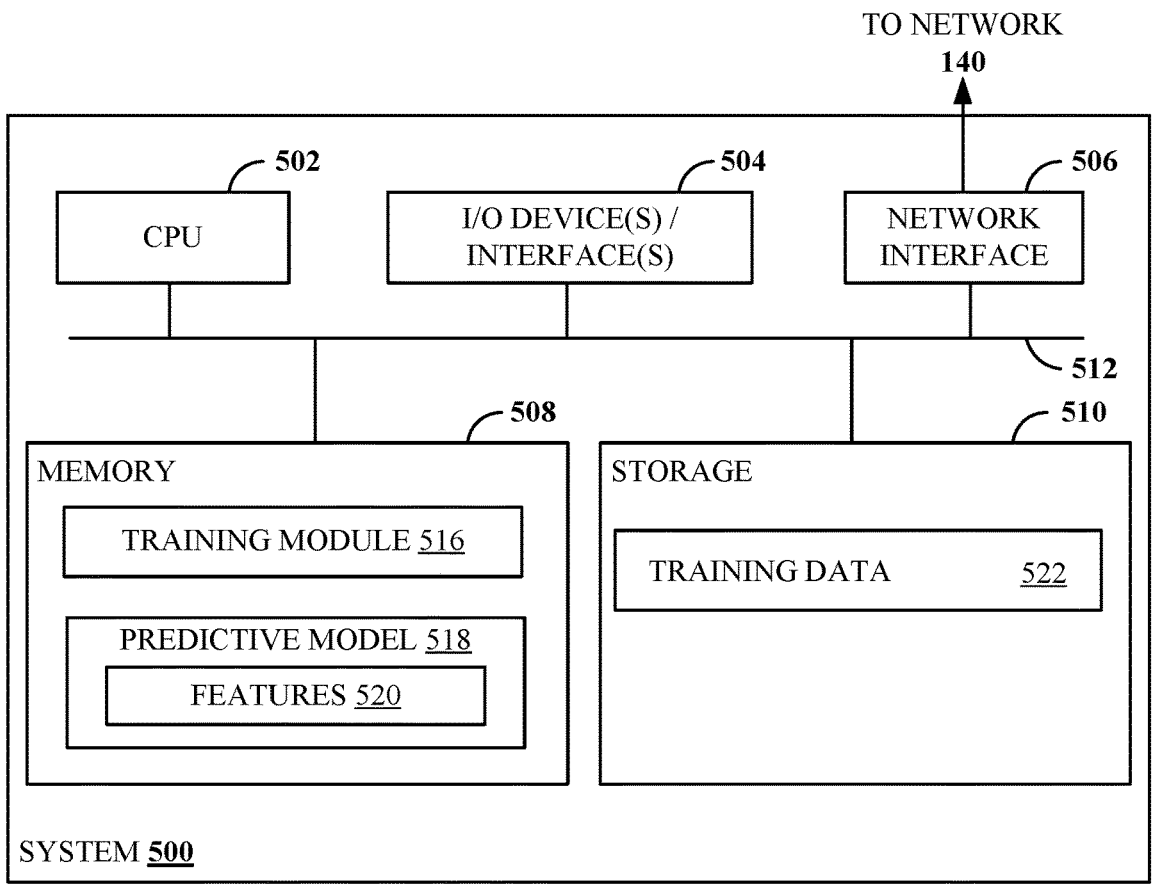
FIGS. 5A and 5B depict example computer systems with which embodiments of the present disclosure may be implemented.

FIG. 5A illustrates an example system 500 used for improving a user experience based on electronic records of transactions. For example, system 500 may be representative of computing device 110 in FIG. 1.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, storage 510, and an interconnect 512. It is contemplated that one or more components of system 500 may be located remotely and accessed via a network. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises training data 522, which may comprise historical data as described herein, which may be broken into features (e.g., input features derived from historical activity data and historical issue data) and labels (e.g., identifying actionable solutions derived from historical solution data).

As shown, memory 508 includes a training module 516, which may perform operations related to training predictive model 518, such as based on training data 522 (e.g., as described with respect to FIGS. 1-4).

Memory 508 also includes a predictive model 518, which may be trained by training module 526 to identify issues and determine actionable solutions based on activity data according to techniques described herein (e.g., with respect to FIGS. 1-4). Predictive model 518 comprises features 520 that are used to determine the output of the predictive model 518 for each training instance in training data 522 based on the input features of the training instance.

In some embodiments, predictive model 518 is used (e.g., by an application such as application 132 of FIG. 1) to determine an actionable solution to an issue based on activity data, which may be featurized, of a user (e.g., as described above with respect to FIGS. 1-4).

Figure 5B:
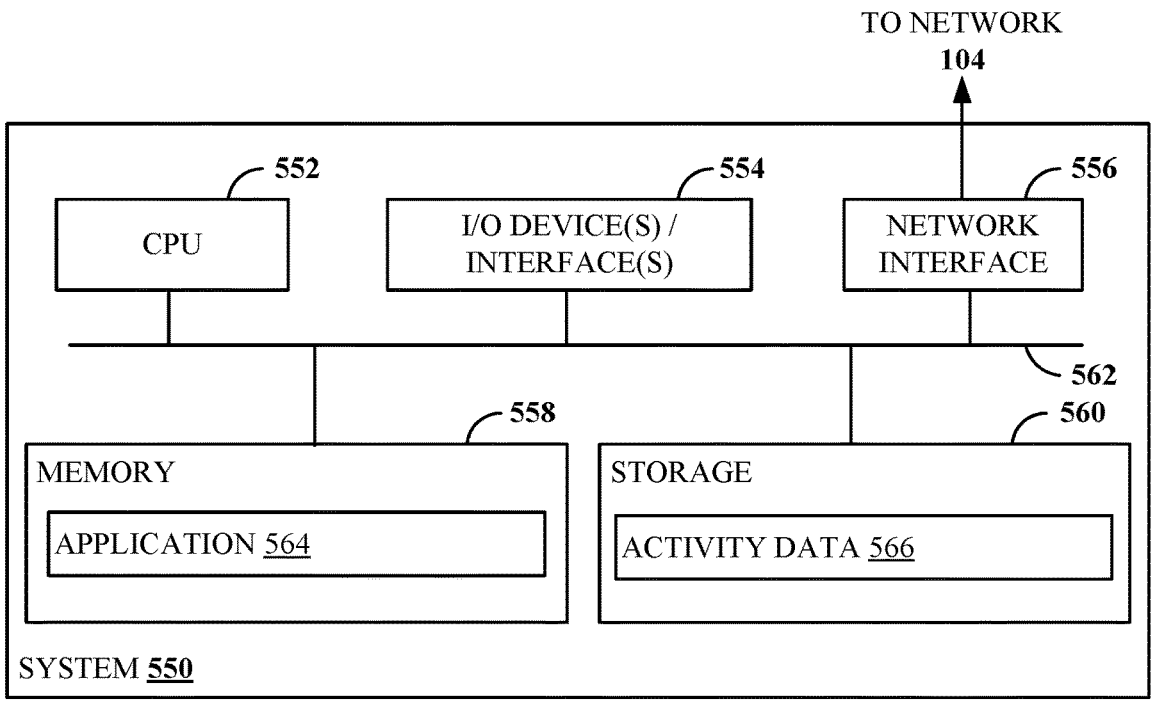

FIG. 5B illustrates an example system 550 used for improving a user experience based on electronic records of transactions. For example, system 550 may be representative of external-facing server 130 in FIG. 1.

System 550 includes a CPU 552 connected to a data bus 562. CPU 552 is configured to process computer-executable instructions, e.g., stored in memory 558 or storage 560, and to cause system 550 to perform methods as described herein, for example with respect to FIGS. 1-4. CPU 552 is included to be representative of a single CPU, multiple CPUs, a single CPU having multiple processing cores, and other forms of processing architecture capable of executing computer-executable instructions.

System 550 further includes input/output device and interface 554, which allow, for example, a user to interact with remote device 550. For example, a user may interact with application 564 as described above with respect to FIGS. 1-4. For example, an input/output device of system 550 may include a touch-sensitive display screen. Note that while not depicted with independent external I/O devices, system 550 may likewise connect with external I/O devices through physical and wireless connections (e.g., a wireless keyboard via a short-range data connection such as Bluetooth).

System 550 further includes network interface 506, which provides systems 500 and 550 with access to external computing devices, such as described with respect to FIG. 1.

System 550 further includes memory 558, which in this example includes application 565, which may be, for example, a personal or business finance application, as described above with respect to FIGS. 1-4. Note that while shown as a single memory 558 in FIG. 5B for simplicity, the various aspects stored in memory 558 may be stored in different physical memories, but all accessible to CPU 552 via internal data connections, such as bus 562.

System 550 further includes storage 560, which in this example includes activity data 566. In some examples, activity data 566 comprises data related to user interactions with application 565 as described above. As with memory 558, a single storage 560 is depicted in FIG. 5B for simplicity, but the various aspects stored in storage 560 may be stored in different physical storages, but all accessible to CPU 552 via internal data connections, such as bus 562.

The content and configuration of systems 500 in FIG. 5A and 550 in FIG. 5B are just one example, and other configurations are possible.

The preceding description provides examples, and is not limiting of the scope, applicability, or embodiments set forth in the claims. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. In addition, the scope of the disclosure is intended to cover such an apparatus or method that is practiced using other structure, functionality, or structure and functionality in addition to, or other than, the various aspects of the disclosure set forth herein.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for improving a user experience of an application, comprising:
   receiving user activity information related to activities of a user during use of the application;
   providing the user activity information as input to a predictive model, wherein the predictive model has been trained through a supervised machine learning process using features derived from historical activity data associated with labels derived from historical solution data associated with a plurality of users to determine actionable solutions to issues related to use of the application, wherein the historical solution data comprises data related to actions that historically resulted in resolutions of issues indicated by the historical activity data, and wherein the historical solution data indicates that modifying previously-provided login information on a particular user interface screen historically resolved a particular issue related to automatically logging in, by the application, to a user account associated with a separate application;
   determining, based on output from the predictive model, an actionable solution to the particular issue, wherein the particular issue is related to use of the application by the user;
   providing the actionable solution to the user via a user interface associated with the application, wherein the actionable solution is provided without being initiated by the user, and wherein providing the actionable solution to the user via the user interface associated with the application comprises:
      replacing a current user interface screen displayed within the user interface with the particular user interface screen comprising login information that the user previously provided via the particular user interface screen, wherein the login information corresponds to an account of the user associated with a different application that is separate from the application; and
      prompting the user to modify the login information that the user previously provided via the particular user interface screen; and
   determining whether the particular issue related to use of the application by the user was resolved by the actionable solution based on clickstream data or log data related to performing the actionable solution within the application, wherein the predictive model is re-trained based on the determining whether the particular issue related to use of the application by the user was resolved by the actionable solution.

2. The method of claim 1, wherein the predictive model is trained based, at least in part, on comparing intermediate points in task completion in the historical activity data.

3. The method of claim 1,
   wherein the user activity information comprises at least one of the following: clickstream data; search data; chat data; or voice data, and
   wherein the predictive model determines the actionable solution based on at least a subset of the user activity information.

4. The method of claim 1, wherein:
   the actionable solution comprises help content, and
   providing the actionable solution to the user via the user interface further comprises presenting the help content to the user in a portion of the user interface without being initiated by the user.

5. The method of claim 1,
   wherein the actionable solution comprises a particular workflow related to the login information previously provided by the user via the particular user interface screen, and
   wherein replacing the current user interface screen displayed within the user interface with the particular user interface screen comprises changing a workflow of the application to the particular workflow in the user interface.

6. The method of claim 5,
   wherein the actionable solution is further based on personal user data of the user, and
   wherein the predictive model determines the actionable solution, at least in part based on an association between the personal user data and the actionable solution in the predictive model.

7. The method of claim 1, wherein the particular issue relates to incorrect use of the application by the user.

8. A non-transitory computer-readable medium comprising instructions that, when executed by one or more processors, cause the one or more processors to perform a method for improving a user experience of an application, the method comprising:
   receiving user activity information related to activities of a user during use of the application;

providing the user activity information as input to a predictive model, wherein the predictive model has been trained through a supervised machine learning process using features derived from historical activity data associated with labels derived from historical solution data associated with a plurality of users to determine actionable solutions to issues related to use of the application, wherein the historical solution data comprises data related to actions that historically resulted in resolutions of issues indicated by the historical activity data, and wherein the historical solution data indicates that modifying preciously-provided login information on a particular user interface screen historically resolved a particular issue related to automatically logging in, by the application, to a user account associated with a separate application;

determining, based on output from the predictive model, an actionable solution to the particular issue, wherein the particular issue is related to use of the application by the user;

providing the actionable solution to the user via a user interface associated with the application, wherein the actionable solution is provided without being initiated by the user, and wherein providing the actionable solution to the user via the user interface associated with the application comprises:

replacing a current user interface screen displayed within the user interface with the particular user interface screen comprising login information that the user previously provided via the particular user interface screen, wherein the login information corresponds to an account of the user associated with a different application that is separate from the application; and prompting the user to modify the login information that the user previously provided via the particular user interface screen; and determining whether the particular issue related to use of the application by the user was resolved by the actionable solution based on clickstream data or log data related to performing the actionable solution within the application, wherein the predictive model is re-trained based on the determining whether the particular issue related to use of the application by the user was resolved by the actionable solution.

9. The non-transitory computer-readable medium of claim 8, wherein the predictive model is trained based, at least in part, on comparing intermediate points in task completion in the historical activity data.

10. The non-transitory computer-readable medium of claim 8, wherein:
the user activity information comprises at least one of the following: clickstream data; search data; chat data; or voice data, and
the predictive model determines the actionable solution based on at least a subset of the user activity information.

11. The non-transitory computer-readable medium of claim 8,
wherein the actionable solution comprises help content, and
wherein providing the actionable solution to the user via the user interface further comprises presenting the help content to the user in a portion of the user interface without being initiated by the user.

12. The non-transitory computer-readable medium of claim 8, wherein the actionable solution comprises a particular workflow related to the login information previously provided by the user via the particular user interface screen, and wherein replacing the current user interface screen displayed within the user interface with the particular user interface screen comprises changing a workflow of the application to the particular workflow in the user interface.

13. The non-transitory computer-readable medium of claim 12,
wherein the actionable solution is further based on personal user data of the user, and
wherein the predictive model determines the actionable solution, at least in part based on an association between the personal user data and the actionable solution in the predictive model.

14. The non-transitory computer-readable medium of claim 8, wherein the particular issue relates to incorrect use of the application by the user.

15. A system, comprising one or more processors and a non-transitory computer-readable medium comprising instructions that, when executed by the one or more processors, cause the one or more processors to perform a method for improving a user experience of an application, the method comprising:

receiving user activity information related to activities of a user during use of the application;

providing the user activity information as input to a predictive model, wherein the predictive model has been trained through a supervised machine learning process using features derived from historical activity data associated with labels derived from historical solution data associated with a plurality of users to determine actionable solutions to issues related to use of the application, wherein the historical solution data comprises data related to actions that historically resulted in resolutions of issues indicated by the historical activity data, and wherein the historical solution data indicates that modifying previously-provided login information on a particular user interface screen historically resolved a particular issue related to automatically logging in, by the application, to a user account associated with a separate application;

determining, based on output from the predictive model, an actionable solution to the particular issue, wherein the particular issue is related to use of the application by the user;

providing the actionable solution to the user via a user interface associated with the application, wherein the actionable solution is provided without being initiated by the user, and wherein providing the actionable solution to the user via the user interface associated with the application comprises:

replacing a current user interface screen displayed within the user interface with the particular user interface screen comprising login information that the user previously provided via the particular user interface screen, wherein the login information corresponds to an account of the user associated with a different application that is separate from the application; and prompting the user to modify the login information that the user previously provided via the particular user interface screen; and determining whether the particular issue related to use of the application by the user was resolved by the actionable solution based on clickstream data or log data related to performing the actionable solution within the application, wherein the predictive model is re-trained based on the determining whether the particular issue related to use of the application by the user was resolved by the actionable solution.

16. The system of claim 15, wherein the predictive model is trained based, at least in part, on comparing intermediate points in task completion in the historical activity data.

17. The system of claim 15, wherein:
the user activity information comprises at least one of the following: clickstream data; search data; chat data; or voice data, and
the predictive model determines the actionable solution based on at least a subset of the user activity information.

18. The system of claim 15,
wherein the actionable solution comprises help content, and
wherein providing the actionable solution to the user via the user interface further comprises presenting the help content to the user in a portion of the user interface without being initiated by the user.

19. The system of claim 15,
wherein the actionable solution comprises a particular workflow related to the login information previously provided by the user via the particular user interface screen, and
wherein replacing the current user interface screen displayed within the user interface with the particular user interface screen comprises changing a workflow of the application to the particular workflow in the user interface.

20. The system of claim 19,
wherein the actionable solution is further based on personal user data of the user, and
wherein the predictive model determines the actionable solution, at least in part based on an association between the personal user data and the actionable solution in the predictive model.

21. The system of claim 15, wherein the particular issue relates to incorrect use of the application by the user.

* * * * *